No. 686,831. PATENTED MAY 5, 1908.
W. MAYER.
PULLEY.
APPLICATION FILED AUG. 24, 1907.
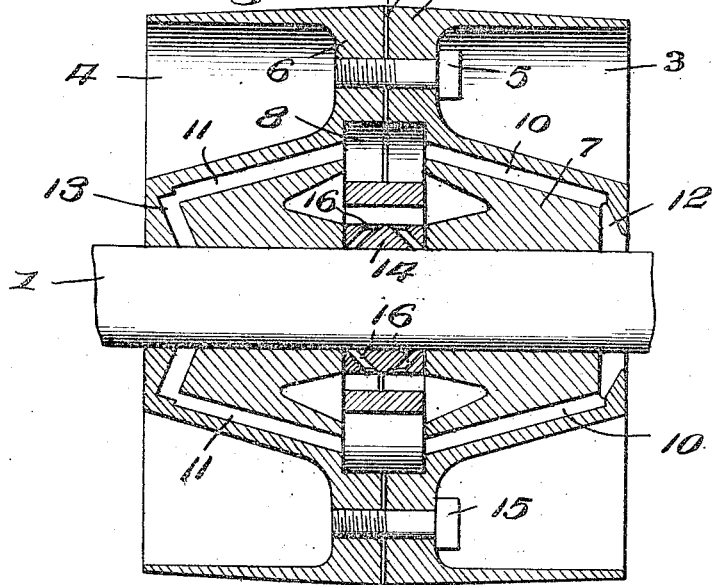
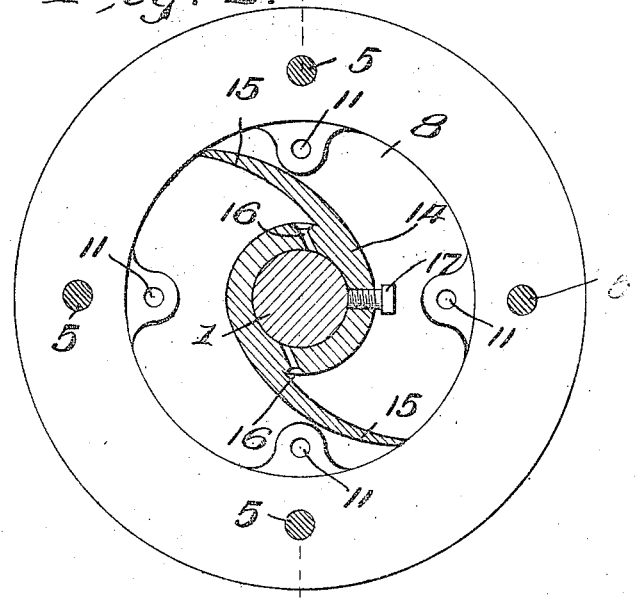
WITNESSES: INVENTOR
W. Mayer
BY
Attorneys

UNITED STATES PATENT OFFICE.

WILLIAM MAYER, OF CHICAGO, ILLINOIS.

PULLEY.

No. 886,831.  Specification of Letters Patent.  Patented May 5, 1908.

Application filed August 24, 1907. Serial No. 389,975.

*To all whom it may concern:*

Be it known that I, WILLIAM MAYER, a citizen of the United States, residing at Chicago, in the county of Cook and State of Illinois, have invented certain new and useful Improvements in Pulleys; and I do hereby declare the following to be a full, clear, and exact description of the invention, such as will enable others skilled in the art to which it appertains to make and use the same.

My invention relates to improvements in pulleys, and more particularly to that class adapted to be used as idlers, and my object is to provide means for introducing oil into the hub of the pulley, whereby the shaft upon which the pulley revolves, will be thoroughly lubricated.

A further object is to provide means for holding the oil in the hub of the pulley, when in a horizontal or vertical position, or at any angle between the two positions, and a still further object is to provide means to cause the oil to flow through various ports in the hub.

Other objects and advantages will be hereinafter referred to and more particularly pointed out in the claims.

In the accompanying drawings which are made a part of this application, Figure 1 is a central, sectional view through the pulley, as seen on line 1—1, Fig. 2, showing the same applied to use, and, Fig. 2 is a sectional view, as seen on line 2—2, Fig. 1.

Referring to the drawings in which similar reference numerals designate corresponding parts throughout the several views, 1 indicates a driving shaft, upon one end of which is loosely mounted my improved form of pulley 2, said pulley being preferably formed in two sections 3 and 4, each section forming one-half of the pulley, and said sections are secured together by means of bolts 5, engaging webs 6 at the meeting edges of the two sections.

The pulley 2 is provided with a hub 7, one-half of which is on each of the sections 3 and 4 and the central portion of said hub is provided with a lubricating cavity 8, into which oil is adapted to be introduced, and in order to prevent leakage at the point of intersection of the two sections of the pulley, a gasket, or the like 9, is placed between the meeting edges of the sections and clamped therebetween by means of the bolts 5, thereby preventing leakage of oil at this point.

Extending longitudinally through the two sections of the hub 7, are a plurality of bores 10 and 11, said bores communicating at their inner ends with the cavity 8, while the outer ends of the bores 10 communicate with a groove 12 in the outer end of the pulley, said groove being adapted to catch the oil as it passes to the outer end of the shaft 1, thereby preventing the oil from leaking upon the floor, the oil, when deposited in said groove, entering the bores 10 and returning to the cavity 8.

The bores 11 extend from the cavity 8 to a point adjacent the inner end of the hub, where they intersect an inclined channel 13, adjacent the end of the hub, said channel catching oil moving along the shaft towards the inner end of the hub and returning the same through the bores 11 to the cavity 8.

The channel 13 is inclined downwardly from its inner edge so that when the shaft is at an angle to the horizontal, the oil descending on the shaft, will readily enter the inclined channel and pass to the lower end thereof, where it will be thrown by centrifugal force through the bores 11 and into the cavity 8.

In order to gather the oil when returned to the cavity through the respective bores and convey the same into engagement with the shaft 1, a collar 14 is secured to the shaft, said collar being located in the cavity 8 and provided with a pair of curved tangentially disposed wings 15, which extend from the collar to the inner wall of the cavity, the collar having ports 16 therethrough, so that the oil may be conveyed directly to the shaft, said ports being located at the base of the wings 15 and on the concave side of the wings.

The collar 14 is fixed to the shaft by means of a set screw or the like 17, so that as the pulley is rotated around the shaft, the wings 15 will gather the oil and cause the same to move towards the center of the cavity and pass through the ports 16 onto the shaft 1.

In operation, the oil is poured into the groove 12 at the free end of the pulley, from whence it passes into the cavity 8 through the bores 10 and is gathered up by the wings 15 and directed through the ports 16 and onto the driving shaft 1. The oil then passes to opposite ends of the hub of the pulley and is collected, respectively, by the inclined channel 13 and groove 12 and again returned to the cavity 8, through the various bores 10 and 11.

By this construction it will be seen that the pulley will be thoroughly lubricated when being rotated and the lubricating material used repeatedly.

It will further be seen that by employing the collar 14 and wings thereon, the oil will be gathered from the outer edge of the cavity 8 and again employed as a lubricant for the driving shaft.

What I claim is:

A pulley of the character described, consisting of two suitably connected together sections, formed within themselves with hub-sections, said hub-sections having opposed cavities forming a lubricating chamber at the center of the pulley, said hub-sections also having oppositely-inclined longitudinal bores leading from said lubricating chamber, also a groove and a channel arranged therein, near their outer ends, the latter inclining inwardly toward the center of the pulley, said channel and groove communicating with said bores, and a collar fixed in position, intermediate of said pulley-sections, and having curved tangential wings arranged within said lubricating chamber, said collar also having ports or ducts therethrough.

In testimony whereof I have signed my name to this specification in the presence of two subscribing witnesses.

WILLIAM MAYER.

Witnesses:
A. J. KULLSCHEUER,
A. L. Morris.